2,944,938

TRI-P-ANISYL-CHLOROETHYLENE COMPOSITION

Edwin D. Carkhuff and Paul A. Tuerck, Cincinnati, Ohio, assignors to The Wm. S. Merrell Company No Drawing. Filed Apr. 29, 1958, Ser. No. 731,597

5 Claims. (Cl. 167—55)

Our invention relates to medicinal compositions. In particular, our invention relates to compositions comprising a medicament, tri-p-anisylchloroethylene, in certain hard fats as carriers.

Tri-p-anisylchloroethylene or chlorotrianisene is an estrogenic agent useful for the treatment of atrophic rhinitis, amenorrhea, trophic vulvo vaginitis, inhibition of lactation and in the treatment of the menopause. This solid compound has been administered in an oral dosage form, i.e., capsules, with certain oils, e.g., corn oil, as carriers to provide absorption from the gastrointestinal tract. The oral dosages can range from about 6 to 150 mg. daily of the compound. In the use of the compound with corn oil, the maximum practical solubility of the compound in the corn oil limits the unit dosage to 12 mg. of the medicament in 1 cc. (approximately 1 gram) of corn oil, a maximum solubility of about 1.2%. While more of the compound can be dissolved in hot corn oil, it will not stay in solution on cooling but will crystallize out so that the 1.2% solubility is the maximum for a pharmaceutical product. Other oils have approximately the same solubilizing power with the medicament. Because of this low dosage form, administration of considerable quantities of the compound to provide effective dosages is extremely troublesome and unwieldy.

We have now found that the compound is unexpectedly and remarkably more soluble in certain hard fats than in oils such as corn oil, i.e., more of the compound can be dissolved in the hot fat and retained in solution when the fat is cooled without the formation of crystals. This remarkably greater solubility provides a pharmaceutical unit dosage form of greater effectiveness than previously obtainable. For example, the medicament can be dissolved in hot glyceryl tristearate (tristearin) and the mixture cooled to provide a solid solution of the compound and the hard fat containing as much as about 90 percent of the compound as compared to only 1.2 percent in corn oil. The combination of the medicament and the hard fat or corn oil is surprisingly more effective therapeutically than the medicament alone, e.g., in various forms such as a micronized form. Apparently, the hard fat or corn oil provides a greater absorption of the medicament in the gastrointestinal tract and increases its effectiveness. Thus, since more of the compound can be dissolved in the hard fat and retained in solution on cooling than corn oil, the combination of the medicament and hard fat provides an advantageously more potent dosage form which provides the medicament in an effective consistently physiologically active form.

In addition to the effective higher dosage, the medicament in the hard fat provides other advantages over oil solutions. A smaller bulk is obtained and hence smaller or fewer dosage units, e.g., capsules, are required for therapeutic dosages which greatly facilitates administration. Also, capsules, for example, are more easily filled. Also, the medicament in the hard fat can be easily tableted. Also, no observable precipitation of the compound which interferes with effectiveness occurs as is frequently found in capsules of the medicament in corn oil. Also, other active medicaments can be included with the combination with greater ease.

The hard fats useful in our invention are edible, digestible glyceryl stearate fats which are hard solids at room temperature, i.e., glyceryl monostearate, glyceryl distearate and glyceryl tristearate and mixtures thereof. These hard fats all provide the remarkable solubilizing effect on the medicament. The glyceryl stearates can be the pure stearate or commercial grades, e.g., edible grade glyceryl monostearates or tristearin, which include mixtures of stearates, and in some cases other constituents such as glyceryl palmitates. By the term hard fat we mean to exclude fats such as tallows, lard and butters which although solids at room temperature are not considered hard fats. Generally, the hard fats have melting points above about 50° C. while the tallows, lard and butters have melting points below this figure. For example, the melting point of commercial grade tristearin is about 55° C. to 62° C., of pure tristearin about 73.1° C., of commercial grade monostearin about 56 to 66° C. and of pure monostearin about 81.5° C.

The tri-p-anisylchloroethylene can be incorporated in the fat by melting the solid fat, dissolving the medicament in the hot fat solution and cooling to obtain a solid. The resulting solid is a solid solution of the medicament and the fat. As a solid solution, crystallization of the medicament which interferes with effectiveness is prevented or greatly retarded. The solid solution is then ground to a dry powder which can be encapsulated, tableted or suspended in liquid vehicles for liquid dosage forms.

The solid solution can be prepared in concentrations of as high as 90 percent of the compound, e.g., from 5 to 90 percent. It is preferable, however, to keep the concentration of the compound at not more than 50 percent since undesirable amounts of crystals of the compound, which interfere with effectiveness, may possibly form when the hot solution is solidified by cooling when the concentration is above this amount. At a concentration of as high as 90 percent, however, no separate crystals of the compound in the solid solution have been observed under a polarizing microscope.

Other water-insoluble, oil-soluble medicaments useful for oral administration can be incorporated into the solution of tri-p-anisylchloroethylene and fat. For example, other estrogens and endocrines, such as Ergonovine or methyltestosterone, or tranquilizers, such as Quiactin (2-ethyl-3-propyl-glycidamide) can be readily incorporated with the solutions, preferably by mixing the solid solution with solid powdered medicament. The combination with Quiactin is useful in treatment of the menopause and the combination with Ergonovine is useful for treatment of patients after childbirth where nursing is not desired.

In clinical tests, the compound in tristearin in the form of the capsules of Example 1 was found to provide effective higher dosages than the compound in corn oil and to be more effective than the compound alone. Micronized or other forms of the compound alone are not effective or as effective as the combination with corn oil or the hard fats because the forms of the compound alone are not properly absorbed from the gastrointestinal tract. The hard fat, however, provides good absorption of the compound from the gastrointestinal tract and provides an effective higher dosage than corn oil.

Our invention will be further illustrated by the following examples.

Example 1

Ninety (90) grams of edible grade tristearin were heated to 95° C. Ten (10) grams of tri-p-anisylchloroethylene were added to the melted fat and the mixture cooled to room temperature. The resulting solid was a solid solution of the compound and tristearin containing 100 mg. of tri-p-anisylchloroethylene per 1 gram of tristearin. The solid solution of tri-p-anisylchloroethylene and tristearin was then ground to a fine particle size using an oscillating grinder equipped with a 16 mesh screen.

The powdered solid was lubricated with a 20% of magnesium stearate and filled into No. 0 hard gelatin capsules using a regular Parke-Davis Model 8 capsule filling machine to a net fill weight of 0.3 gram. Each finished capsule contained 25 mg. of tri-p-anisylchloroethylene in tristearin.

The edible grade tristearin used was in flake form and had the following properties:

| | |
|---|---|
| Color (Lovibond) | 30.0 yellow, 3.5 red max. |
| Free fatty acid | 0.10 max. |
| Iodine value | 5.0 max. |
| Saponification value | 188–192. |
| M.P. | 144° F. min. (62° C.). |
| Titer (solidification temp.) | 58° C. min. |

*Example 2*

By the procedure of Example 1 using an edible grade of glyceryl monostearate instead of tristearin a similar solid solution of tri-p-anisylchloroethylene and glyceryl monostearate and capsules containing the powdered solid were obtained.

The glyceryl monostearate used was "Arlacel–161," a commercially available product of the following properties:

| | |
|---|---|
| Form | White solid, bead form. |
| Monoglyceride | 40–44%. |
| M.P. | 59–61° C. |
| Iodine value | Less than 2. |
| Free glycerine | Not over 0.6%. |
| Free fatty acid (as oleic) | Not over 0.5%. |
| Normal ash | Not over 0.1%. |
| Moisture | Not over 0.5%. |

Another glyceryl monostearate which can be used is "Arlacel–169" which has the following properties:

| | |
|---|---|
| Form | White solid, bead form. |
| Monoglyceride | 61–66% |
| M.P. | 60°–62° C. |
| Free glycerine | Not over 1.5%. |
| Free fatty acid (as oleic) | Not over 0.5%. |
| Normal ash | Not over 0.1%. |
| Moisture | Not over 0.5%. |

*Example 3*

By the procedure of Example 1 using a mixture of 50% the tristearin of Example 1 and 50% of the "Arlacel–161" edible grade of glyceryl monostearate of Example 2 instead of tristearin alone a similar solid solution of tri-p-anisylchloroethylene and the mixture of tristearin and glyceryl monostearate and capsules containing the powdered solid are obtained.

*Example 4*

By using 20, 30, 40, 50, 60, 70, 80 and 90 grams of tri-p-anisylchloroethylene and, respectively, 80, 70, 60, 50, 40, 30, 20 and 10 grams of edible grade tristearin in the procedure of Example 1, solid solutions, and capsules containing them, of concentrations of 20, 30, 40, 50, 60, 70, 80 and 90% of tri-p-anisylchloroethylene in tristearin were obtained.

*Example 5*

By granulating the powdered solid solution of 10% tri-p-anisylchloroethylene of Example 1 with 10% gelatin solution (prepared by adding an edible grade of gelatin with stirring to a sufficient quantity of hot water and stirring until solution is effected) as a granulating agent, adding corn starch as a diluent and guar flour as a disintegrator and tabletting the resultant powder in a conventional tabletting machine, tablets of the composition of the capsules of Example 1 were obtained.

By using the solid solutions of Examples 2 to 4 and following the same procedure other tablets can be made.

Other granulating agents can be used such as 20% sorbitol solution (prepared by dissolving sorbitol in ethyl alcohol using stirring and gentle heat, if necessary) or 10% gelatin-10% glucose solution (prepared by adding gelatin and glucose to hot water with stirring until solution is effected). Other diluents can be used such as lactose, sucrose or dicalcium phosphate. Other disintegrators can be used such as corn starch, powdered karaya or carboxymethocel.

*Example 6*

By suspending the powdered solid solution of Example 1 in water, a liquid dosage form of a suspension of the powder is obtained. The other solid solutions of Examples 2 to 4 can be similarly prepared in the form of suspensions. Other suspending agents such as "Veegum," carboxymethocel, methocel or "Carbopol 934" can be used.

*Example 7*

To the powdered solid solution of Example 1 were added 0.2 gram of powdered quiactin per capsule. After mixing, a solid product was obtained which was encapsulated according to the procedure of Example 1. Tablets and suspensions of the solid product can also be made by the procedures of Examples 5 and 6.

*Example 8*

To the powdered solid solution of Example 1 were added 0.1 milligram of powdered ergonovine per capsule. After mixing, a solid product was obtained which was encapsulated according to the procedure of Example 1. Tablets and suspensions of the solid product can also be made by the procedures of Examples 5 and 6.

*Example 9*

To the powdered solid solution of Example 1 were added 2.5 milligrams of powdered methyl testosterone per capsule. After mixing, a solid product was obtained which was encapsulated according to the procedure of Example 1. Tablets and suspensions of the solid product can also be made of the procedures of Examples 5 and 6.

We claim:

1. A composition for oral administration of tri-p-anisylchloroethylene whereby increased absorption of tri-p-anisylchloroethylene in the gastro-intestinal tract is obtained which comprises tri-p-anisylchloroethylene dissolved in a hard edible digestible glyceryl fat, the amount of tri-p-anisylchloroethylene being from 10 to 50 percent by weight of the fat.

2. A composition in accordance with claim 1 in which the hard fat is glyceryl tristearate.

3. A composition in accordance with claim 1 in the form of a fine powder.

4. A composition in accordance with claim 1 in which the tri-p-anisylchloroethylene is present to the extent of about 10 percent of the hard fat.

5. A composition for the oral administration of tri-p-anisylchloroethylene whereby increased absorption of the tri-p-anisylchloroethylene in the gastro-intestinal tract is obtained which comprises in dosage unit form 10 to 50 parts by weight of a finely ground solution of tri-p-anisylchloroethylene in a hard edible digestible glyceryl fat.

References Cited in the file of this patent
UNITED STATES PATENTS 2,793,979  Svedres _____ May 28, 1957

OTHER REFERENCES

U.S. Dispensatory, 25th ed., 1955, pp. 1681, 1682, Lippincott Co., Philadelphia, Pa.